United States Patent
Drakoulis et al.

(10) Patent No.: US 7,082,203 B1
(45) Date of Patent: Jul. 25, 2006

(54) WIRELESS AUDIO TRANSMISSION METHOD AND APPARATUS FOR COUPLING AUDIO PLAYERS TO AUDIO RECEIVERS

(76) Inventors: Niko Drakoulis, 2500 Harlem Ave., Elmwood Park, IL (US) 60707; Ronald G. Pace, 2523 River Wood Dr., Naperville, IL (US) 60565

(*) Notice: Subject to any disclaimer, the term of this patent is extended or adjusted under 35 U.S.C. 154(b) by 750 days.

(21) Appl. No.: 09/903,129

(22) Filed: Jul. 11, 2001

Related U.S. Application Data

(60) Provisional application No. 60/259,823, filed on Jan. 5, 2001.

(51) Int. Cl.
  *H04B 3/00* (2006.01)
  *H04B 5/00* (2006.01)
  *H04B 1/034* (2006.01)
  *H04B 1/06* (2006.01)
  *H04H 5/00* (2006.01)
  *H01B 4/66* (2006.01)

(52) U.S. Cl. ............... 381/77; 381/14; 381/79; 455/345; 455/99; 439/92; 439/98

(58) Field of Classification Search .............. 381/77, 381/79, 14; 455/555, 42, 99, 345; 439/92, 439/98, 105
See application file for complete search history.

(56) References Cited

U.S. PATENT DOCUMENTS

| | | | | |
|---|---|---|---|---|
| 3,393,201 A | | 7/1968 | Preau ................... 260/326.3 |
| 4,495,643 A | | 1/1985 | Orban ....................... 381/94 |
| 4,712,250 A | | 12/1987 | Michels et al. ............. 455/20 |
| 4,845,751 A | * | 7/1989 | Schwab ..................... 381/311 |
| 4,864,550 A | | 9/1989 | Kawanaka ................... 369/6 |
| 5,244,705 A | | 9/1993 | Tsurushima et al. ......... 428/64 |
| 5,319,716 A | * | 6/1994 | McGreevy .................. 381/79 |
| 5,511,000 A | | 4/1996 | Kaloi et al. ................ 364/514 |
| 5,640,458 A | | 6/1997 | Nishiguchi et al. .......... 381/74 |
| 5,771,441 A | * | 6/1998 | Altstatt .................... 455/66.1 |
| 5,832,438 A | * | 11/1998 | Bauer ...................... 704/270 |
| 5,930,758 A | | 7/1999 | Nishiguchi et al. ......... 704/500 |

OTHER PUBLICATIONS

Belkin TuneCast published Feb. 26, 2003.
Irock Wireless Music Adapter 300W publication date unknown.

(Continued)

*Primary Examiner*—Huyen Le
*Assistant Examiner*—Devona E Faulk
(74) *Attorney, Agent, or Firm*—Young & Basile, P.C.

(57) ABSTRACT

A wireless audio transmission apparatus and method for coupling audio players to audio receivers for broadcast of audio signals stored in and processed by the audio player. A housing carrying operative circuitry is electrically connected by a multiconductor cable to an audio player for receiving stereo channel signals. Band pass filters couple the stereo signal and signal ground conductors in the cable to the stereo encoder in the housing. The filtered stereo signals are received by a stereo encoder in the housing and modulated onto a radio frequency carrier signal. A transmitter coupled to an antenna carried in the cable wirelessly transmits the carrier signal and the audio signals to a remote radio frequency receiver for demodulation and broadcast of the audio signals. Preferably, the carrier signal is an FM radio frequency signal. The carrier signal is optionally selectable from a plurality of different carrier signal frequencies. In an optional aspect, the operative circuitry in the housing may be embedded directly in an audio player.

13 Claims, 7 Drawing Sheets

OTHER PUBLICATIONS

Dynex Portable Wireless FM Transmitter model DX-AC101 publication 2003-2004.
AudiaX II Wireless FM Transmitter for MIP3/DVD publication 2003-2004.
Z-cyber Wireless Transmitter publication 2003-2004.
Arkon model Nos. 120, 121, 121i published 1998.
Arkon Sound Feeder models 150a. 150c, and 250 published Feb. 15, 2004.

* cited by examiner

FIG-10
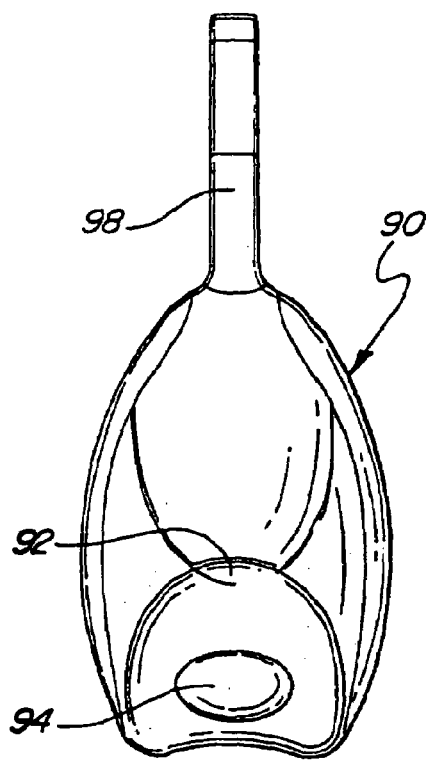
FIG-11
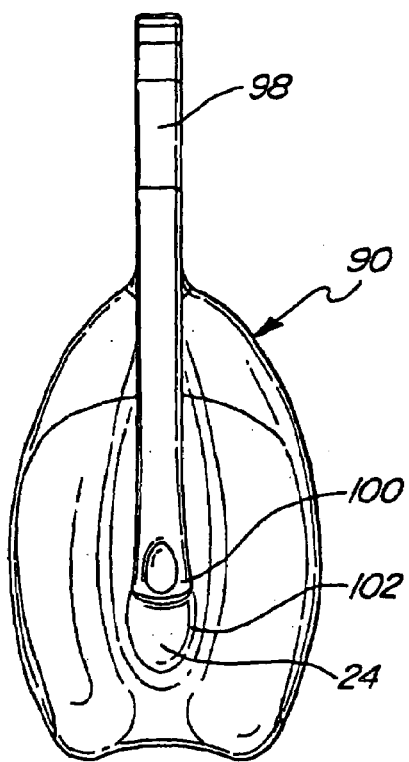
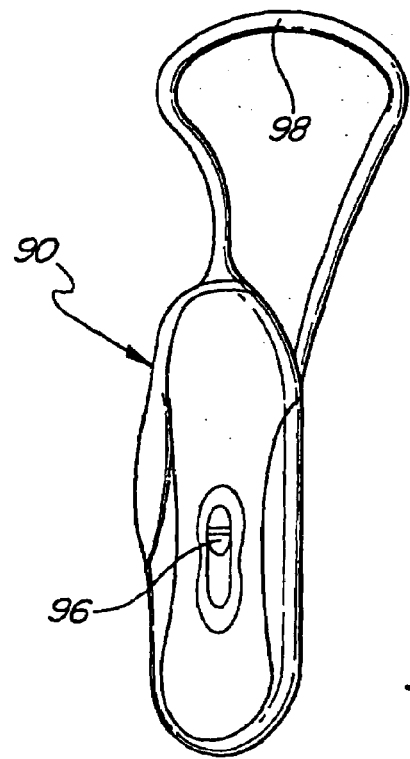
FIG-12

WIRELESS AUDIO TRANSMISSION METHOD AND APPARATUS FOR COUPLING AUDIO PLAYERS TO AUDIO RECEIVERS

CROSS REFERENCE TO CO-PENDING APPLICATION

This application claims the benefit of the priority date of co-pending, provisional patent application Ser. No. 60/259,823, filed Jan. 5, 2001 for "Wireless Audio Transmission Device Coupling Audio Players To Audio Receivers".

BACKGROUND

Portable audio players using MP3 or other audio compression have proved extremely popular in the digital audio era. In using such portable audio players, a memory card is coupled to a digital signal source, such as a personal computer, CD burner, etc., which downloads digital files containing compressed audio sounds, such as music, to the portable memory. The memory card is then transferred from the digital audio source device to the portable audio player. Suitable controls on the audio player enable the digitally stored audio sounds on the memory card to be played, typically through headphones attached to the audio player by a cable.

While this use of a portable audio player is extremely popular in certain activities are in which headphones are easily used, the use of headphones in automobiles by the vehicle driver is prohibited by law as it represents an unsafe condition for the driver.

What is needed is a method and apparatus which enables a portable audio player to be used in an automobile where the audible sounds converted from the digital music stored in the audio player are broadcast through the vehicle's audio system. It would also be desirable to provide a method and apparatus which can be easily coupled to a standard portable audio player without requiring modification to the audio player.

SUMMARY

The present invention is a wireless audio transmission method and apparatus for coupling audio signals generated by audio players to audio receivers for broadcast of the audio signals.

In one aspect of the invention, the apparatus includes a wireless audio transmitter coupling an audio player having an audio signal output to an audio receiver capable of outputting audio signals at a first frequency. The apparatus includes a portable housing. A connector is coupled to the housing and adapted for coupling the audio output signal from an audio player to a radio frequency oscillator carried in the housing, the radio frequency oscillator generating a radio frequency carrier.

A radio frequency modulator carried in the housing modulates the audio signal output of the audio player on the radio frequency player. An antenna is carried on the housing and coupled to the modulator for wirelessly transmitting the modulated signal to a remote audio receiver.

Preferably, the radio frequency carrier signal is selectable from a plurality of distinct carrier frequency signals. A selector switch is provided on the housing for selection of the radio frequency carrier signal frequency.

The connector includes a cable having a first end coupled to the housing and a second free end adapted to be coupled to the audio player. A connector also includes a jack carried on the free end of the cable.

The first and second stereo channel and signal ground conductors are carried in the cable and connected to the connector. A signal transmitter antenna is also carried in the cable. The antenna has an end spaced from and non-connected to the connector.

Band pass filters are coupled to each of the stereo channel and the signal ground conductors in the cable to eliminate the need for separate shielding of the antenna from the stereo channel conductors and to improve antenna performance.

In one aspect of the invention, the connector is removably receivable in a recess carried externally on the housing. When the connector is mounted in the recess, the cable forms a loop capable of convenient hand carrying of the housing.

In an another aspect of the invention, a method is provided for generating audio sounds on a radio frequency audio sound generator from a remote audio signal source generating audio signals from an audio signal storage media. The method comprises the steps of:

connecting an audio signal source to a portable housing;

generating audio signals from an audio signal storage media in the audio signal source;

coupling the audio signals to a stereo encoder carried in the housing;

generating a first frequency radio frequency carrier signal;

modulating the audio signals on the first frequency radio frequency carrier signal; and transmitting the first frequency radio frequency carrier signal and the audio signals to a radio frequency audio signal demodulator in a remote radio frequency audio signal generator for broadcast of the audio signals.

In one aspect, the method includes the step of providing the audio signal generator and the audio transmitter in separate housings with the separate housings coupled in signal communication.

The method also includes the step of providing the first frequency carrier signal as a carrier signal within the FM radio frequency band. The method also includes the step of selecting one of a plurality of distinct radio frequency carrier signals.

In one aspect, the first and second stereo channel conductors and a signal ground conductor are mounted in a cable connecting the housing to the audio player. An antenna is also carried in the cable.

The method also includes the step of connecting band pass filters to each of the stereo channel conductors and the signal ground conductor in the cable.

The method also includes the step of providing a connector mounted on a free end of the cable and connected to the stereo channel and signal ground conductors. The conductor is releasably connectable to an audio player. A further method step provides a recess externally on the housing for removably receiving the connector on the cable. When the connector is mounted in the recess, the cable forms a convenient hand carrying loop.

In another aspect of the invention, the method includes:

connecting an audio signal source to a portable housing;

generating audio signals from an audio signal storage media in the audio signal source;

coupling the audio signals to a stereo encoder carried in the housing;

generating a first frequency radio frequency carrier signal;

modulating the audio signals on the first frequency radio frequency carrier signal; and transmitting the first frequency radio frequency carrier signal to a radio frequency audio signal demodulator in a remote radio frequency audio signal generator for broadcast of the audio signals.

The method and apparatus of the present invention uniquely enable a portable player, such as an audio player carrying a digital audio signal storage media which is capable of generating audio signals, to be used in a vehicle where headphones normally attached to the audio player are prohibited by law from use by the vehicle driver. The housing and operative circuitry of the present invention is electrically connected to the audio output of the audio player for wirelessly transmitting the audio signals on a radio frequency carrier signal to a remote radio frequency receiver where the audio signals are demodulated and broadcast. The remote radio frequency signal receiver can be a vehicle audio receiver.

The components of the housing are packaged in a small, easily carryable housing. The stereo channel and signal ground conductors and the antenna conductor are imbedded in a single cable without shielding due to the use of the band pass filters coupled to each of the stereo channel and signal ground conductors.

The provision of a connector receiving recess in the housing enables the connector on the free end of the cable to be conveniently mounted in the recess when not connected to an audio player. In this mounting position, the cable forms a loop for easy hand carrying of the housing.

A carrier frequency selection is provided by the switch on the housing enables selection of one of a plurality of different radio frequency carrier signals for clear audio signal broadcast.

BRIEF DESCRIPTION OF THE DRAWING

The various features, advantages and other uses of the present invention will become more apparent by referring to the following detailed description and drawing in which:

FIG. 10 is a frontal elevational view of another aspect of a housing of the audio link of the present invention;

FIG. 11 is a rear elevational view of the housing shown in FIG. 10;

FIG. 12 is a right hand side elevational view of the housing shown in FIGS. 10 and 11;

DETAILED DESCRIPTION

Figure 1:
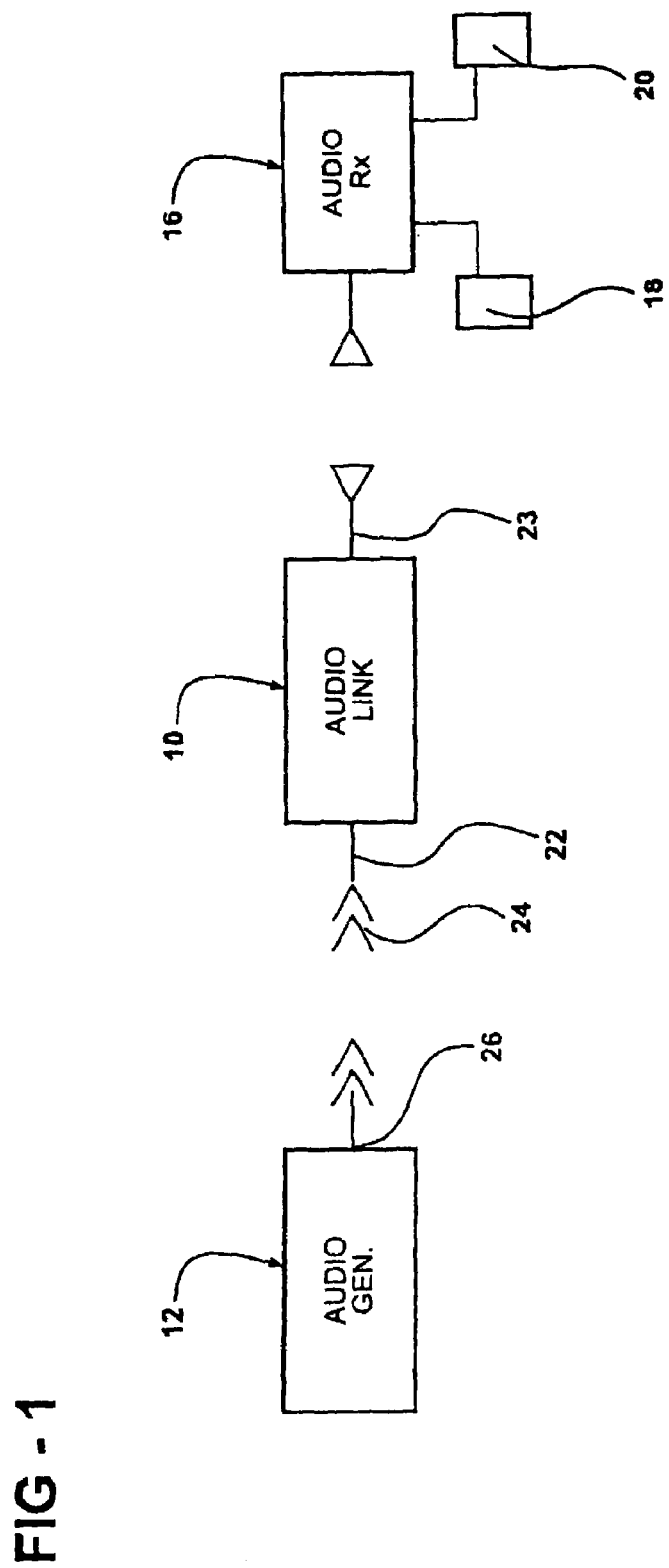
FIG. 1 is a general block diagram showing the overall operation of the audio link method and apparatus of the present invention.

As shown generally in FIG. 1, a wireless audio link 10 of the present invention wirelessly transmits audio signals, such as music, from audio generators 12, such as portable audio players (CD, MP3, MINIDISC, DVD) to audio receivers 16, such as FM stereos, within a selected range, approximately 10–20 feet, for example. Such receivers 16 typically have stereo left and right channel speakers 18 and 20 associated therewith. Such a FM stereo receiver which may be an in-house stereo receiver, an in-car mounted FM radio, etc.

Figure 5:
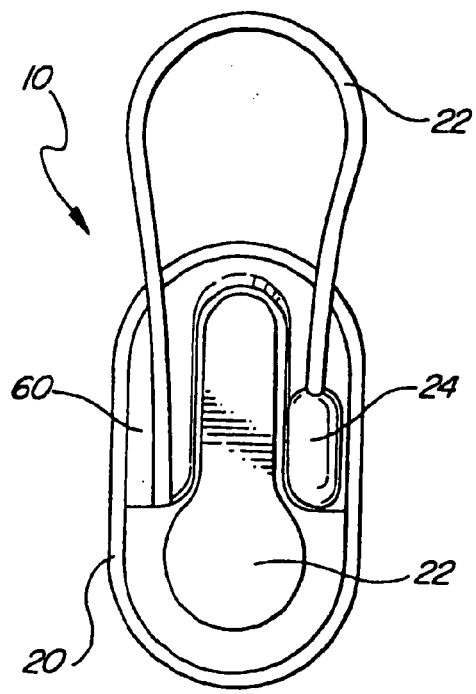
FIG. 5 is a rear view of a housing shown in FIG. 3.
Figure 6:
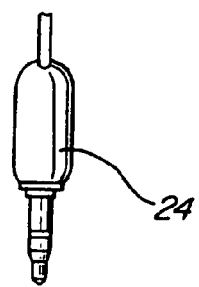
FIG. 6 is an enlarged view of the connector plug employed on the antenna mounted on the housing shown in FIGS. 3–5.

A cable or conductor 22 having a suitable end connector, such as a jack 24 shown in FIGS. 5 and 6, extends from the housing 60 of the audio link 10 to the audio out/headphone jack 26 of the audio generator device 12. The cable or multi-conductor 22 also carries an antenna 23 for the audio link 10, even though the antenna is symbolically shown separately in FIG. 1.

Figure 2:
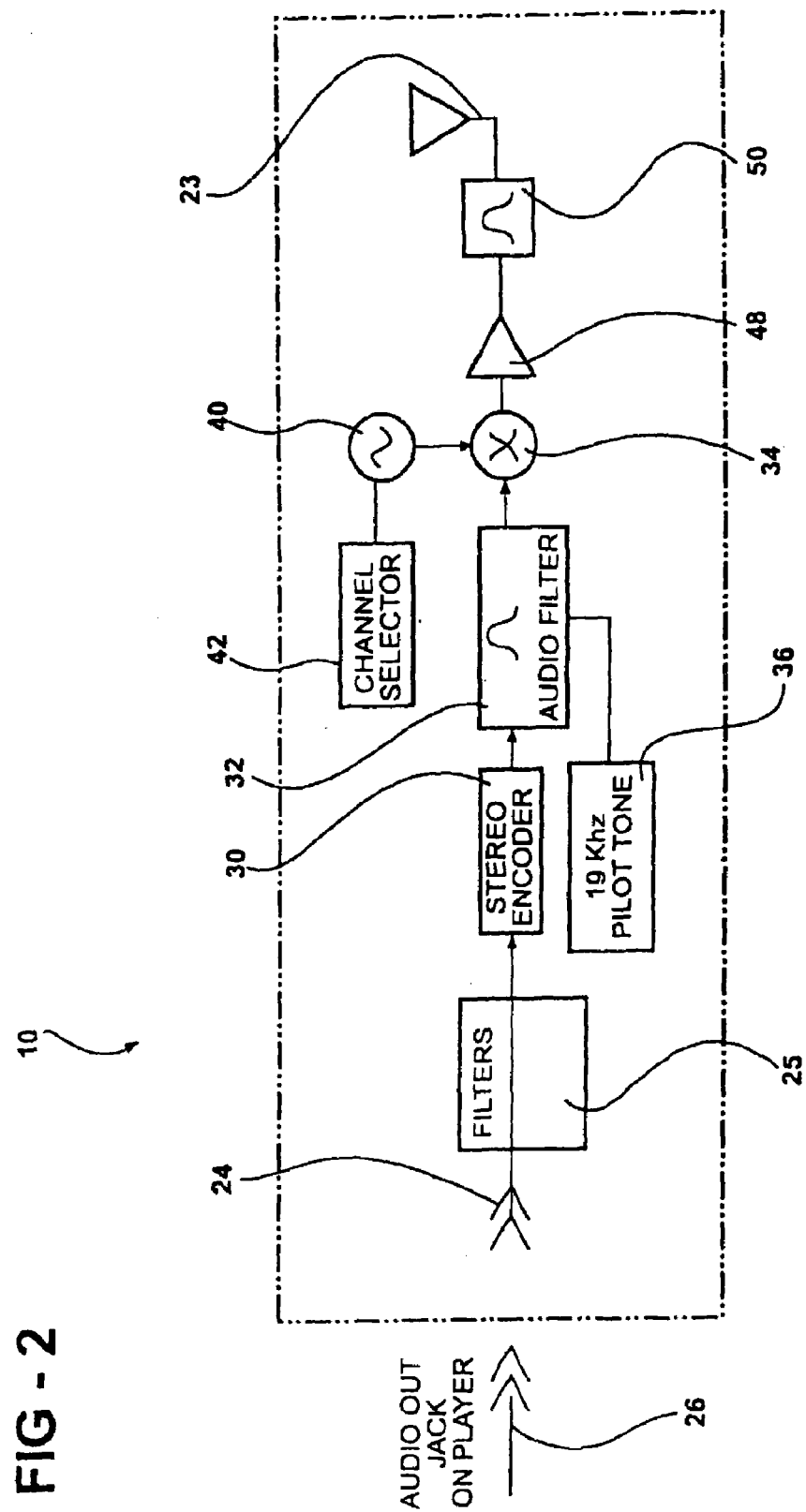
FIG. 2 is a detailed block diagram of the audio link of the present invention shown in FIG. 1.

The cable 22 carries three, individual, signal conductors, namely a left channel stereo signal conductor, a right channel stereo signal conductor and a signal ground conductor. An antenna 23, as shown in FIGS. 1 and 2 and described hereafter, is also carried in the cable 22. A jack or connector 24 is connected to the stereo channel and the signal ground conductors in the cable 22; but not to the antenna 23. The signals on the signal conductors are input through the connector 24 to a plurality of hi Q bandpass Rf isolation filters 25 to eliminate the need for separate shielding of the antenna 23 within the cable 22 and to improve the performance of the antenna 23. The outputs of the left and right channel filters are supplied to a stereo encoder 30 which encodes the incoming audio signals in two separate stereo channels. The output of the stereo encoder 30 is passed through an audio filter 32 to an FM modulator 34. Also input to the modulator 34 is a 19 KHz pilot tone from an oscillator 36.

Figure 13:
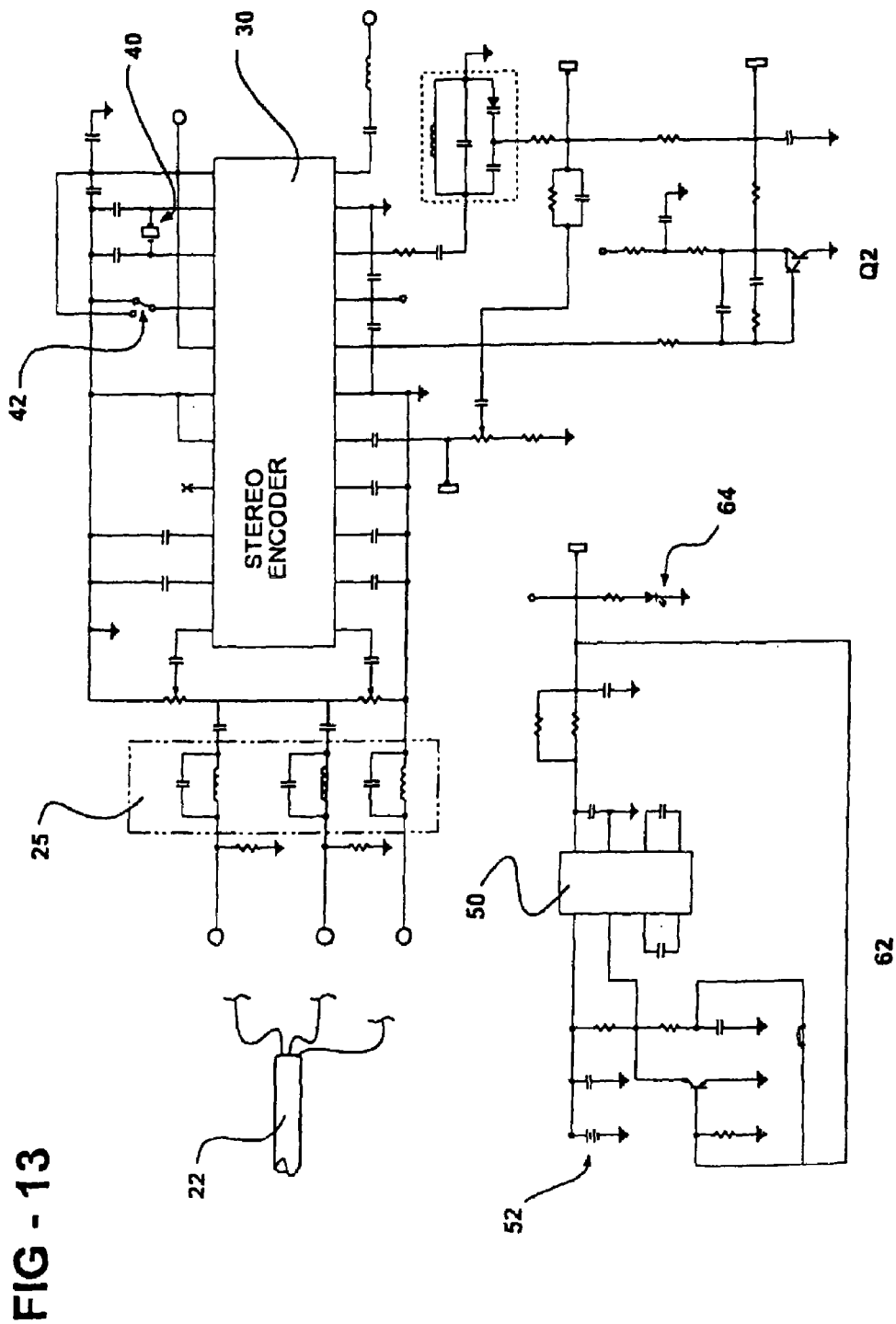
FIG. 13 is a detailed schematic diagram of the audio link circuit shown generally in FIG. 2.

A detailed schematic of the block diagram shown in FIG. 2 is depicted in FIG. 13. A power supply, such as a DC to DC converter 50 in the form of a step-up charge pump, model MAX 619, sold by Maxim Integrated Products, is connected to a battery contained within the housing of the audio link 10. An on/off switch 62, also mounted on the housing, controls the on/off connection of the converter 50 to the battery 52 and thereby the output of regulated DC power to the remainder of the circuitry shown in FIG. 13.

Another input to the FM modulator 34 is the output of an Rf oscillator 40 which can be tuned to any desired radio frequency, preferably within the FM frequency band of FM receivers. One or more frequencies maybe provided. The following description of the use of 88.1 MHz and 88.3 MHz will be understood to be an example only. A channel or frequency selector 42 is connected to the Rf oscillator 40 to generate the selected radio frequency output carrier signal at an 88.1 Mz or 88.3 MHz frequency. The channel selector 42 utilizes a frequency selector pushbutton or slide selector switch 46 shown in FIGS. 4 and 8 to select one of two discrete frequencies, such as the 88.1 MHz or 88.3 MHz carrier frequencies. The pushbutton or switch 46 selects the divider counter value in a phase lock (PPL) oscillator to provide the desired carrier frequency.

Alternately, the pushbutton or selector switch 46 is input to a microprocessor in the stereo encoder 30 which generates a code on a three wire interface (clock, data, and enable) to select a different oscillator output frequency.

The output of the FM modulator oscillator 34 passes through a Rf amplifier 48 and an Rf filter 50 before being transmitted via the antenna 23 over a predetermined range 16, such as 10–20 feet, by example only. The FM modulator 36, amplifier 48 and filter 50 maybe provided in a single integrated circuit chip, such as a wireless audio link sold under Model No. BH1416S/F by Rohm.

This signal is received by the audio receiver 16, such an a FM stereo receiver, which may be an in-house stereo receiver, an in-car mounted FM radio, etc.

FIGS. 3–6 depict one aspect of a housing 60 for the audio link 10 of the present invention. In this aspect, the cable 22 serves the functions of a connector, antenna and a carrying strap when the jack 24 is clipped in a pocket or recess on the back of the housing 60 as seen in FIG. 5.

A large, soft rubber on/off power button 62 for connecting the internally mounted battery 52 to the converter 50 is described above and shown in FIG. 13. A "power on" light, such as an LED 64, is mounted on a circuit board containing the power supply within the housing 60. Light from the LED 64 is communicated by means of a light pipe 66 which has an outer end fixedly mounted in and visible exteriorly of the housing 60.

Alternately, separate LEDs may also be connected by separate light pipes 68 and 69 to show which of the two channels is selected for transmission by the audio link 10.

Figure 3:
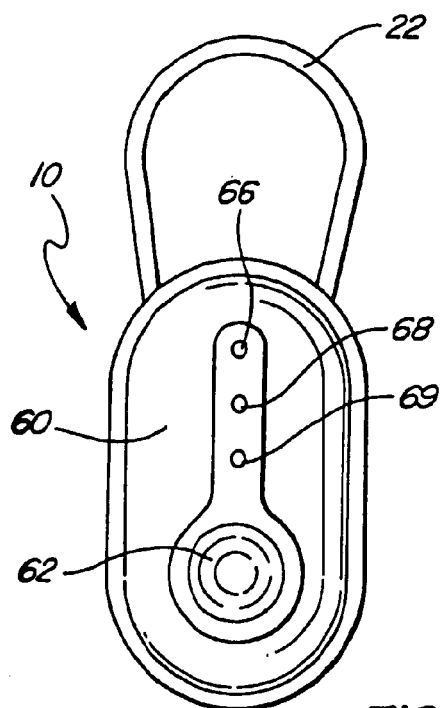
FIG. 3 is a frontal elevation view of one aspect of a housing for the audio link of the present invention.
Figure 4:
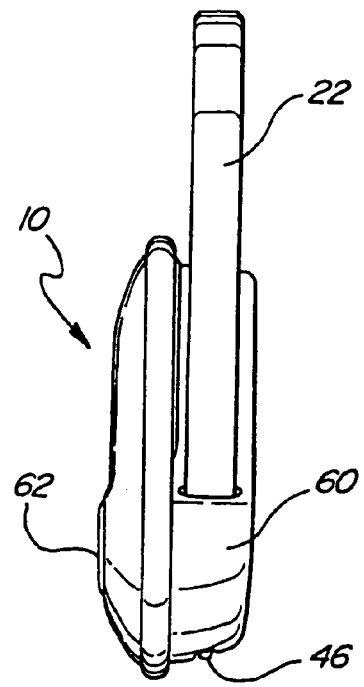
FIG. 4 is a right hand side view of the housing shown in FIG. 3.

As shown in FIGS. 3–5 an exterior overmolded plastic strip 70, preferably of a resilient material is carried on the housing and protectively surrounds the periphery of the housing. An openable door 72 is mounted on the rear of the housing 60 as shown in FIG. 5, for access to the battery 52.

Figure 7:
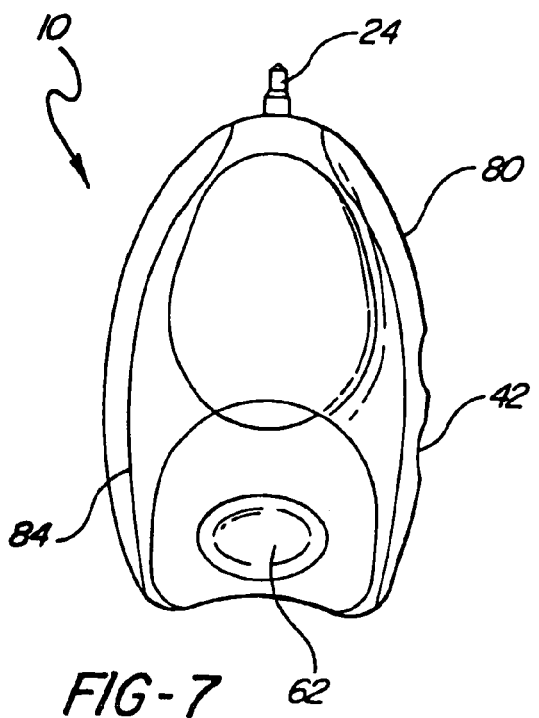
FIG. 7 is a front elevational view of another aspect of a housing for the audio link of the present invention.
Figure 8:
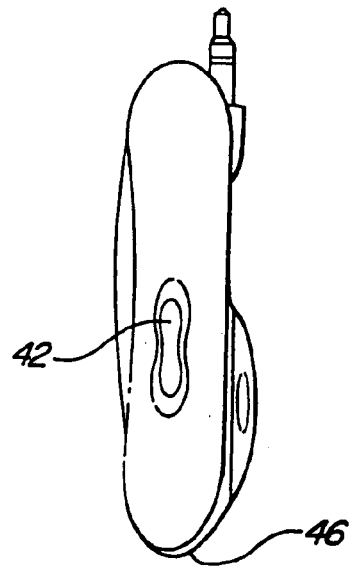
FIG. 8 is a right hand side view of the housing shown in FIG. 7.
Figure 9:
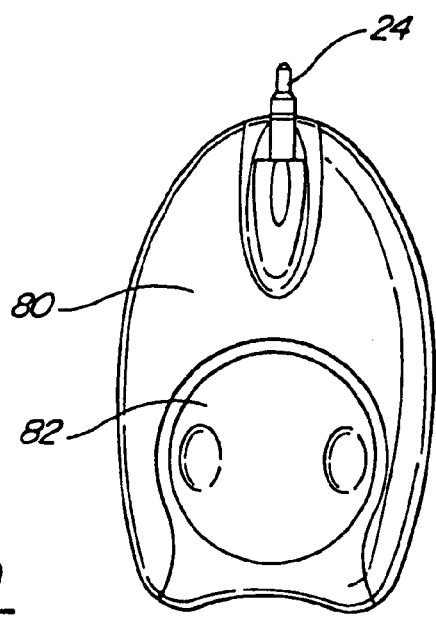
FIG. 9 is a rear elevational view of the housing shown in FIGS. 7 and 8.

Another aspect of a housing for the audio link 10 of the present invention is shown in FIGS. 7–9. In this aspect, the jack 24 is mounted on the end of the cable 22 which is removably contained within a housing 80 on a manual cord reel 82. The jack 24 is merely pulled out of a nested storage position at one end of the housing 60 causing the cable 22 to unwind from the reel 82 to enable the jack 24 to be plugged into the audio output jack 26 on the audio generator or player 12.

A light pipe 84 for the LED is mounted on the front of the housing 80 to be illuminated when the audio link 10 is in a "power on" position. The "power on" push button 62 is mounted on the front of the housing 80 immediately below the LED light pipe 84. The frequency select switch 46 mounted on the housing 64, mounted on the side of the housing 80.

A third aspect of a housing 90 for the audio length 10 of the present invention is shown in FIGS. 10–12. This aspect shares features similar to a housing shown in FIGS. 7–9 in so far as carrying a LED light pipe 92 and a large "power on/off" push button 94 mounted on the front of the housing 90.

The FM transmit frequency selector switch 96 is mounted on the side of the housing 90 as shown in FIG. 12.

The sides of the housing 90 are formed of an overmolded, resilient plastic material. One of the sides is removable so as to serve as a battery access door allowing the battery(s) to be mounted within the housing 90 or replaced when necessary.

The antenna 98 is in the form of a flat cable having one end fixedly connected to the housing 90, with the inner ends of the individual conductors within the cable 90 passing through the housing 90 to circuit connections as shown in FIG. 13. The antenna 98 conductor also extends through the housing 90 to its own connection as shown in FIG. 13. However, the other end of the antenna conductor extends almost through the distal end 100 of the cable 98. The jack or connector 24 is connected to the distal end 100 of the cable 98 and provides connections to the left and right channel and ground conductors within the cable 98, however, the antenna conductor ends short of the distal end 100.

With the jack 24 securely mounted in a recess 102 on the rear surface of the housing 90 as shown in FIG. 11, the cable 98 forms a convenient loop which can act as a carrying handle for the housing 90.

Figure 14:
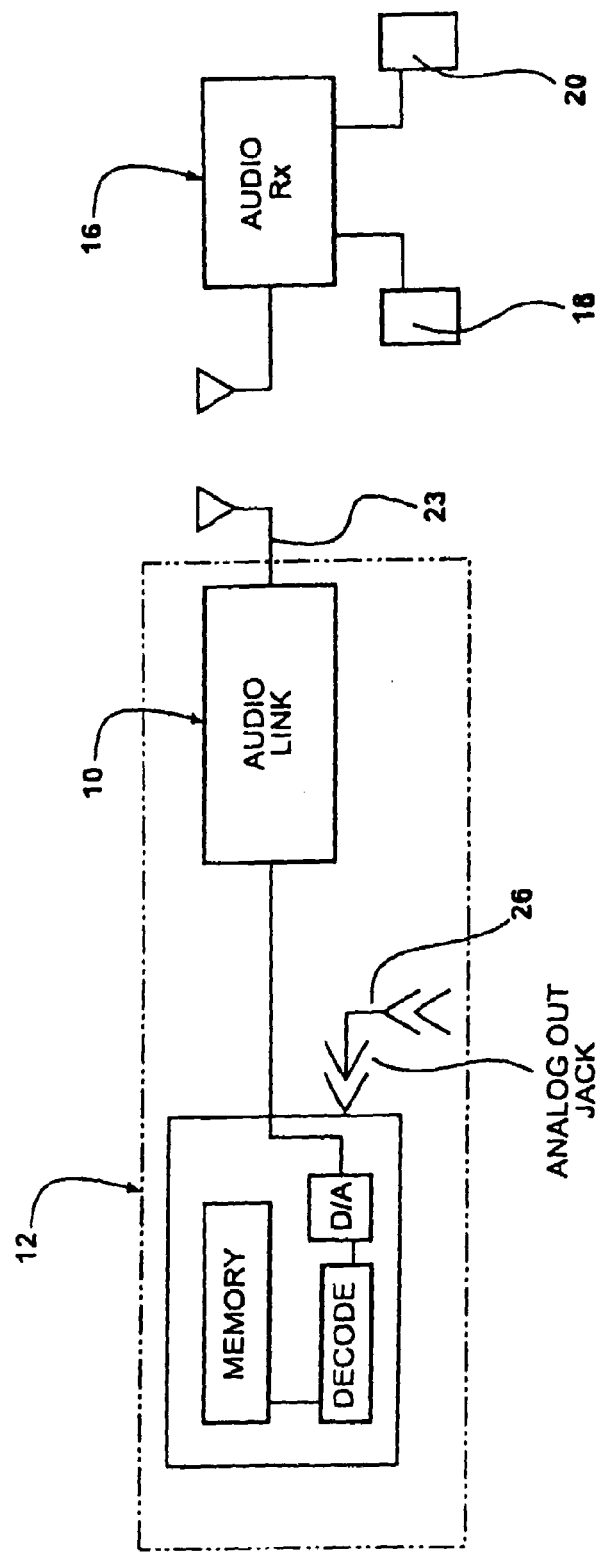
FIG. 14 is a block diagram of another aspect of the audio link of the present invention.

Although various aspects of the audio link 10 of the present invention has been described above as embodied in a small, portable housing which is connected via the cable 22 and the jack 24 to the audio output jack 26 of an audio generator or media player 12, the audio link 10 may be integrally mounted directly within the audio generator or player 12 by incorporation of the various circuit elements shown in FIGS. 2 and 13 directly within the housing of the audio generator or player 12 as shown generally in FIG. 14. The frequency selection switch 46 may be then provided on the housing of the player 12. The antenna carried in the cable 22 may be integrated into the player 12, such as in the housing of the player 12, etc.

What is claimed is:

1. A method for generating audio sounds on a radio frequency audio sound generator from a remote audio signal source, the method comprising the steps of:

supplying an audio signal storage media in the first housing as the audio signal source;

generating audio signals from the audio signal storage media;

providing a cable caring first and second stereo channel signal conductors and a signal ground conductor, the first and second conductors connected at one end to a stereo encoder and at the other end to a connector;

providing an audio output connector on the first housing;

electrically connecting the connector to the audio output connector on the first housing;

generating a first frequency radio frequency carrier signal from an oscillator in a second housing carrying the connector;

modulating the audio signals on the first frequency radio frequency carrier signal;

transmitting the first frequency radio frequency carrier signal with the modulated audio signals to a radio frequency audio signal demodulator in a remote radio frequency receiver for broadcast of the audio signals;

providing a recess externally in the second housing, the recess adapted for removably receiving the connector when the connector is not connected to the audio output connector in the first housing; and forming the cable in a hand carrying loop when the connector is mounted in the recess on the second housing.

2. The method of claim 1 further comprising the steps of:
    providing an audio generator for generating the audio signals and an audio transmitter for transmitting the carrier signal and the modulated audio signal in separate housings.

3. The method of claim 1 wherein the step of generating a first frequency radio frequency carrier signal further comprises the step of:
    selecting one of a plurality of radio frequency carrier signals as the first frequency carrier signal.

4. The method of claim 1 further comprising the step of:
    terminating the opposite end of the antenna conductor in the cable disconnected from the connector.

5. A method for generating audio sounds on a radio frequency
audio sound generator from a remote audio signal source, the method comprising the steps of:
providing a first housing;
supplying an audio signal storage media in the first housing as the audio signal source;
generating audio signals from the audio signal storage media;
providing a cable carrying first and second stereo channel signal conductors and a signal ground conductor, the first and second conductors connected at one end to a stereo encoder and at the other end to a connector;
providing an audio output connector on the first housing;
electrically connecting the connector to the audio output connector on the first housing;
generating a first frequency radio frequency carrier signal from an oscillator in a second housing carrying the connector;
modulating the audio signals on the first frequency radio frequency carrier signal;
transmitting the first frequency radio frequency carrier signal with the modulated audio signals to a radio frequency audio signal demodulator in a remote radio frequency receiver for broadcast of the audio signals;
providing a recess externally in the second housing, the recess adapted for removably receiving the connector when the connector is not connected to the audio output connector in the first housing; and
providing a plurality of hi Q Rf isolation band pass filters in the second housing one of said hi Q Rf isolation band pass filters each connected between the first and second stereo channel signal conductors and the signal ground conductor in the cable, and the stereo encoder in the second housing respectively.

6. An apparatus for generating sounds on a radio frequency audio generator from a remote audio signal storage media comprising:
a first housing;
an audio signal generator in the first housing for generating audio signals from an audio signal storage media in the first housing;
conductors connected to a second housing and releasably connectable to the first housing for communicating the audio signals from the remote audio signal storage media to the second housing, the conductors including first and second conductors for first and second stereo channel audio signals, a signal ground conductor and an antenna conductor;
an oscillator in the second housing generating a first frequency radio frequency carrier signal;
a modulator coupled to the oscillator for modulating the audio signals with the first frequency radio frequency carrier signal;
a transmitter coupled to the modulator for transmitting the first frequency radio frequency carrier signal with the modulated audio signals to a radio frequency demodulator in a remote radio frequency receiver for broadcast of the audio signals;
a multi-conductor cable extending from the second housing and carrying the conductors;
a plurality of band pass filters carried in the second housing, one band pass filters coupled to each of the first and second conductors and the signal ground conductor.

7. The apparatus of claim 6 further comprising:
a connector coupled to a free end of the cable, the connector adapted for coupling the first and second conductors and the signal ground conductor.

8. The apparatus of claim 6 further comprising:
a recess formed externally in the second housing for removable receiving the connector on the free end of the cable.

9. A wireless audio transmitter apparatus coupling an audio player having an audio signal output to an audio receiver capable of outputting audio signals at a first frequency, the apparatus comprising:
a portable housing;
a connector adapted for coupling to the audio output signal from an audio player to a radio frequency oscillator carried in the housing, the radio frequency oscillator generating a radio frequency carrier;
a radio frequency modulator carried in the housing for modulating the audio signal output of the audio player on the radio frequency carrier;
an antenna conductor of a multi-conductor cable coupled to the modulator for wirelessly transmitting the modulated signal to a remote audio receiver;
a radio frequency selector, coupled to the oscillator, for selecting one of a plurality of different radio frequency carrier signals, the frequency selector switch carried externally on the housing;
the multi-conductor cable extending from the housing and carrying first and second conductors for first and second stereo channel audio signals, a third conductor for a signal ground, and a fourth conductor for the antenna;
a plurality of hi Q Rf isolation band pass filters carried in the housing, one of said hi Q Rf isolation band pass filters coupled to each of the first, second and third conductors respectively.

10. The apparatus of claim 9 further comprising:
a jack coupled to a free end of the cable, the jack adapted for coupling the first, second and third conductors to an audio player.

11. The apparatus of claim 10 further comprising:
a recess formed externally in the housing for removable receiving the jack.

12. A wireless audio transmitter apparatus coupling an audio player having an audio signal output to an audio receiver capable of outputting audio signals at a first frequency, the apparatus comprising:
a portable housing;
a connector adapted for coupling to the audio output signal from an audio player to a radio frequency oscillator carried in the housing, the radio frequency oscillator generating a radio frequency carrier;
a radio frequency modulator carried in the housing for modulating the audio signal output of the audio player on the radio frequency carrier;
an antenna conductor coupled to the modulator for wirelessly transmitting the modulated signal to a remote audio receiver;
a radio frequency selector, coupled to the oscillator, for selecting one of a plurality of different radio frequency carrier signals, the frequency selector switch carried externally on the housing;
a multi-conductor cable extending from the housing and carrying first a and second conductors for first and second stereo channel audio signals, a third conductor for a signal ground, and a fourth conductor for the antenna;

the connector including a jack coupled to the free end of the cable, the jack adapted for coupling the first, second and third conductors to an audio player;

a recess formed externally in the housing for removable receiving the jack;

the cable forms a hand carrying loop when the jack is mounted in the recess on the housing.

13. A method for generating audio sounds on a radio frequency audio sound generator from a remote audio signal source, the method comprising the steps of:

providing a first housing;

providing an audio signal source in the first housing;

generating audio signals from the audio signal source;

providing a cable carrying signal conductors;

providing an audio output connector on the first housing;

electrically connecting the conductors to the audio output connector on the first housing by a connector on an end of the conductors;

generating a first frequency radio frequency carrier signal from an oscillator in a second housing carrying the connector;

connecting the cable to the second housing to supply the audio signals to the second housing;

modulating the audio signals on the first frequency radio frequency carrier signal;

transmitting the first frequency radio frequency carrier signal with the modulated audio signals to a remote radio frequency receiver for broadcast of the audio signals;

providing a recess externally in the second housing, the recess adapted for removably receiving the connector on the conductors when the connector is not connected to the audio output connector in the first housing; and forming the cable in a hand carrying loop when the connector is mounted in the recess on the second housing.

\* \* \* \* \*